United States Patent [19]
Young et al.

[11] Patent Number: 6,108,649
[45] Date of Patent: Aug. 22, 2000

[54] METHOD AND SYSTEM FOR SUPPLANTING A FIRST NAME BASE WITH A SECOND NAME BASE

[75] Inventors: Russell T. Young, Pleasant Grove; Travis W. McKinney, Lehi; Daniel T. Ferguson, Orem; Michael E. Lasky, Highland; Brady A. Anderson, Alpine; Bryan J. Cardoza, American Fork, all of Utah

[73] Assignee: Novell, Inc., Orem, Utah

[21] Appl. No.: 09/034,602

[22] Filed: Mar. 3, 1998

[51] Int. Cl.⁷ ........................................................ G06F 17/30
[52] U.S. Cl. ..................................... 707/4; 707/3; 707/10; 395/200.31; 395/200.49; 395/676; 395/683
[58] Field of Search ................................. 707/4, 10, 200, 707/3; 395/200.31, 683, 676, 200.49

[56] References Cited

U.S. PATENT DOCUMENTS

| | | | |
|---|---|---|---|
| 5,497,492 | 3/1996 | Zbikowski et al. | 713/2 |
| 5,499,379 | 3/1996 | Tanaka et al. | 710/40 |
| 5,600,833 | 2/1997 | Senn et al. | 707/1 |
| 5,608,903 | 3/1997 | Prasad et al. | 707/10 |
| 5,675,782 | 10/1997 | Montague et al. | 713/201 |
| 5,680,586 | 10/1997 | Elkins et al. | 395/500.48 |
| 5,745,902 | 4/1998 | Miller et al. | 707/200 |
| 5,758,344 | 5/1998 | Prasad et al. | 707/10 |
| 5,784,643 | 7/1998 | Shields | 710/5 |
| 5,859,972 | 1/1999 | Subramaniam et al. | 395/200.33 |

OTHER PUBLICATIONS

Tittell, et al., Domains Trust, Relationships, and Groups, Jun., 1996, Windows NT Magazine, pp. 1–4.

Sharick, Windows NT Authentication Learn about account validation for local, domain, and trusted domain logons, Jan. 1997, Windows NT Magazine, pp. 1–5.

Minasi, What's the Difference? Domains and Workgroups, Apr. 1996, Windows NT Magazine, pp. 1–3.

Novell, Inc., NDS for NT, Available Next Month, Helps Business Lower Cost and Complexity of Deploying NT Servers in Enterprise Networks, Oct. 7, 1997, Press Release, pp. 1–4.

Novell, Inc., NDS for NT Technical White Paper, Sep. 1997, World Wide Web publication, pp. 1–7.

*Primary Examiner*—Jean R. Homere
*Attorney, Agent, or Firm*—Dinsmore & Shohl LLP

[57] ABSTRACT

A method and system for supplanting a first name base with a second name base. The system consolidates name bases from different network operating systems into a single name base administrable from a single administration utility. Existing first name base applications continue to execute without modification, as communications are transparently translated and redirected to the second name base, and responses translated and communicated back into a format associated with the first name base. The method and system simplify administration of the network, and consolidate multiple name bases into a single name base.

26 Claims, 3 Drawing Sheets

METHOD AND SYSTEM FOR SUPPLANTING A FIRST NAME BASE WITH A SECOND NAME BASE

FIELD OF THE INVENTION

This invention relates generally to the field of computer networks, and more specifically relates to the field of administering network entities such as computers, file servers, user attributes, and the like.

BACKGROUND OF THE INVENTION

The management and administration of computer networks is extremely important to businesses today. The cost of personal computers has dropped to a level that practically every employee in a business now uses a personal computer in fulfillment of their job responsibilities, and each of these computers is typically coupled to a network for file sharing, printer sharing and the like. Such a computer network can have thousands of users, and hundreds of file servers, facsimile servers, printers, and other network-attached devices. Most businesses have found it necessary to employ one or more highly compensated individuals for the sole purpose of maintaining and administering the company's computer networks. To ease this task, providing intuitive, efficient and robust network administration tools has become a very important focus for vendors of network operating systems (NOSs). In fact, strong network administration capabilities have become such an important aspect of a NOS that NOSs are frequently purchased solely on the strength of their network administration capabilities.

It is common for a business to implement multiple network operating systems on its computer network to leverage the strengths of different network operating systems. For example, one network operating system may excel as an application server platform, while another NOS may excel as a file server platform, or in providing robust network administration features. One drawback with the use of NOSs from multiple vendors is that it requires maintaining a variety of different NOS name bases. A name base is a file, or collection of files, used by a NOS to maintain the names and other relevant attributes of network-attached entities, such as computer users, file servers, printers, and the like. The attributes associated with an entity such as a user can include, for example, the location of the user, their password, and the type of access they have to particular computer resources. Because each NOS maintains its own name base, a network administrator must maintain multiple name bases, and be familiar with the administrative utilities associated with each NOS. Maintaining multiple name bases requires duplication of efforts and resources, and it can be very difficult to synchronize changes to the name bases so that each name base reflects accurate information.

Some attempts have been made at resolving such synchronization problems. For example, programs exist which from time to time automatically propagate changes made to one name base to other name bases. Examples of such programs are Novell Corporation Inc.'s NOVELL ADMINISTRATOR FOR WINDOWS NT and NetVision Corporation's SYNCHRONICITY. Synchronization programs can reduce the need to manually update each name base, but do not eliminate the problem that until synchronization occurs, the name bases contain different definitions for the same entities. Another problem with multiple name bases is the duplication of information, and the additional storage space required, as well as the utilization of valuable processor resources and network bandwidth to propagate changes from one name base to the other name bases on the network, whether accomplished manually or automatically.

Moreover, because network administration is complex, a company typically provides one or more employees with relatively expensive training in the proper use of the network administration tools of a particular NOS. Such costs are increased when multiple NOSs are involved. Unfortunately, companies frequently lose such well-trained individuals to other companies, and must then incur the training expenses repeatedly. Many of these expenses would be minimized if administration of network entities could be consolidated into a single NOS name base.

While one partial solution would be to implement only a single NOS on a network, the reality is that businesses run multiple network operating systems to leverage the strengths of each NOS. Also, some NOSs use a separate name base for each server that defines a separate domain, so that even with one NOS, multiple name bases must be maintained. Therefore, a method and system which would allow one name base to transparently supplant other name bases on the network, such that all communications directed to other name bases are transparently redirected to a single name base would be highly desirable. Such a method and system would allow administrators to use the administration utilities of one NOS to administer all NOSs through a single name base. Such a method and system would eliminate duplication of data, save storage space, and eliminate processing cycles used to synchronize a variety of name bases. Moreover, the need to train individuals in multiple network administration utilities would be eliminated. Another advantage is that a NOS with superior network administration utilities and features, such as a robust directory service, could be used to administer NOSs that lack such features.

Another NOS administration difficulty arises in the workgroup context. A workgroup is a group of peer-to-peer computers. No computer acts solely as a server, and each computer can act as either a client or a server to any other computer in the workgroup. Computers in a work group do not use a single consolidated name base. Instead, each workstation maintains its own name base, in which the network-attached entities associated with that particular workstation are maintained. For example, a respective user identifier and its associated attributes, such as a password, will exist in the name base of each workstation to allow a user to logon to that workstation. If another NOS exists on the network which has more intuitive and robust administration capabilities, it would be desirable to transparently supplant each individual name base with a consolidated name base associated with the more robust NOS. This would eliminate the need to maintain multiple name bases. Moreover, individual name bases render backup of the name base data difficult as each name base must be individually backed up from the respective workstation. Supplanting individual name bases with a consolidated centralized name base would greatly simplify such a backup process. Preferably, consolidation of the individual name bases would be accomplished in such a manner that it is transparent to the user and the processes running on each workstation, to eliminate the need to modify and recompile existing computer processes.

SUMMARY OF THE INVENTION

It is one object of the present invention to provide a system and method for supplanting a first name base with a second name base in a transparent manner.

It is another object of the present invention to provide a method and system for consolidating the administration of multiple network operating systems into a single name base.

It is yet another object of the present invention to provide a method and system for consolidating multiple name bases associated with a first network operating system into a single name base associated with a second network operating system.

It is still another object of the present invention to provide a method and system for consolidating workgroup name bases into a single consolidated name base to achieve a centralized security authority for administering workgroup workstations.

It is still another object of the present invention to provide a method and system for virtualizing a name base.

Additional objects, advantages and other novel features of the invention will be set forth in part in the description that follows and, in part, will become apparent to those skilled in the art upon examination of the invention. To achieve the foregoing and other objects, and in accordance with the purposes of the present invention as described above, a method and system are provided for supplanting a first name base with a second name base. The method includes receiving a request from a process directed to a first name base. The request is translated from a first name base format into a second name base format suitable for communications with the second name base. The second name base is called with the translated request. The second name base returns a response, which is translated from the second name base format into the first name base format. The translated response is then returned to the requesting process. Because the method and system of the present invention handle the translation from a first name base format into a second name base format, and the reverse translation of the response from the second name base format into the first name base format, the originating process is unaware that its communications have been redirected from the first name base to the second name base. No recompilation of application software, such as administration utilities, is necessary.

Since all communications are directed to the second name base, each NOS can be administered with the utilities associated with the second name base, allowing a company to leverage the administration capabilities of one NOS to administer another NOS that has weak administration capabilities.

If network entities exist in the first name base, the method and system can migrate, or move, such entities from the first name base to the second name base. The migration process reads the entities and attributes stored in the first name base and generates corresponding objects in the second name base. If the first name base includes attributes which have no corresponding attributes in the second name base, the class associated with the generated object in the second name base can be extended to include the attributes from the first name base. The second name base is thus a superset of the first name base. After this initial migration process, the first name base need no longer be accessed and all manipulation of network entity information will be via the information stored in the second name base.

According to one embodiment of this invention, a replacement library having entry points suitable for communication with processes that access the first name base is developed. The replacement library replaces an existing library associated with the first name base. Because the entry points in the replacement library are identical to those of the library it replaces, invoking processes are unaware that a replacement library has been installed. The replacement library converts the requests directed to the first name base into a format suitable for communications with the second name base. The translated requests are then forwarded to the second name base. Responses to those requests are received by the replacement library, and are translated back into a format associated with the first name base. The translated response is then returned to the invoking process. The present invention "virtualizes" the first name base by transparently redirecting to the second name base communications that were initially directed to the first name base. Thus, the first name base has a virtual presence to invoking processes, when in fact it is no longer being physically accessed by such processes. Consequently, an invoking process is unaware it is interacting with the second name base instead of the first name base.

According to another embodiment of this invention, a plurality of name bases associated with a workgroup of computers can be consolidated into a single name base. A library is developed offering identical entry points as an existing library on each workgroup computer, and replaces the existing library. The library receives the request directed to the name base of the respective computer, translates the request from a first name base format to a second name base format, and communicates the translated request to the second name base. The response from the second name base is translated from the second name base format to the first name base format. The translated response is returned to the requesting process in the first name base format. No modifications are necessary to applications which communicate with the first name base since all responses are translated back from the second name base format to the first name base format. This invention achieves the consolidation of a plurality of different name bases into a centralized name base from which network entities associated with any computer in the workgroup can be administered. Moreover, such a centralized name base acts as a central authority from which security for all workstations can be maintained, eliminating the need to administer each separate name base from each workstation.

Still other objects of the present invention will become apparent to those skilled in this art from the following description, wherein there is shown and described preferred embodiments of this invention. As will be realized, the invention is capable of other different obvious aspects, all without departing from the invention. Accordingly, the drawings and description will be regarded as illustrative in nature and not as restrictive.

BRIEF DESCRIPTION OF THE DRAWINGS

The accompanying drawings, incorporated in and forming a part of the specification, illustrate several aspects of the present invention, and together with the description, serve to explain the principles of the invention. In the drawings.

Reference will now be made in detail to present preferred embodiments of the invention, examples of which are illustrated in the accompanying drawings, wherein like numerals indicate the same elements throughout the views.

DETAILED DESCRIPTION

Figure 1:
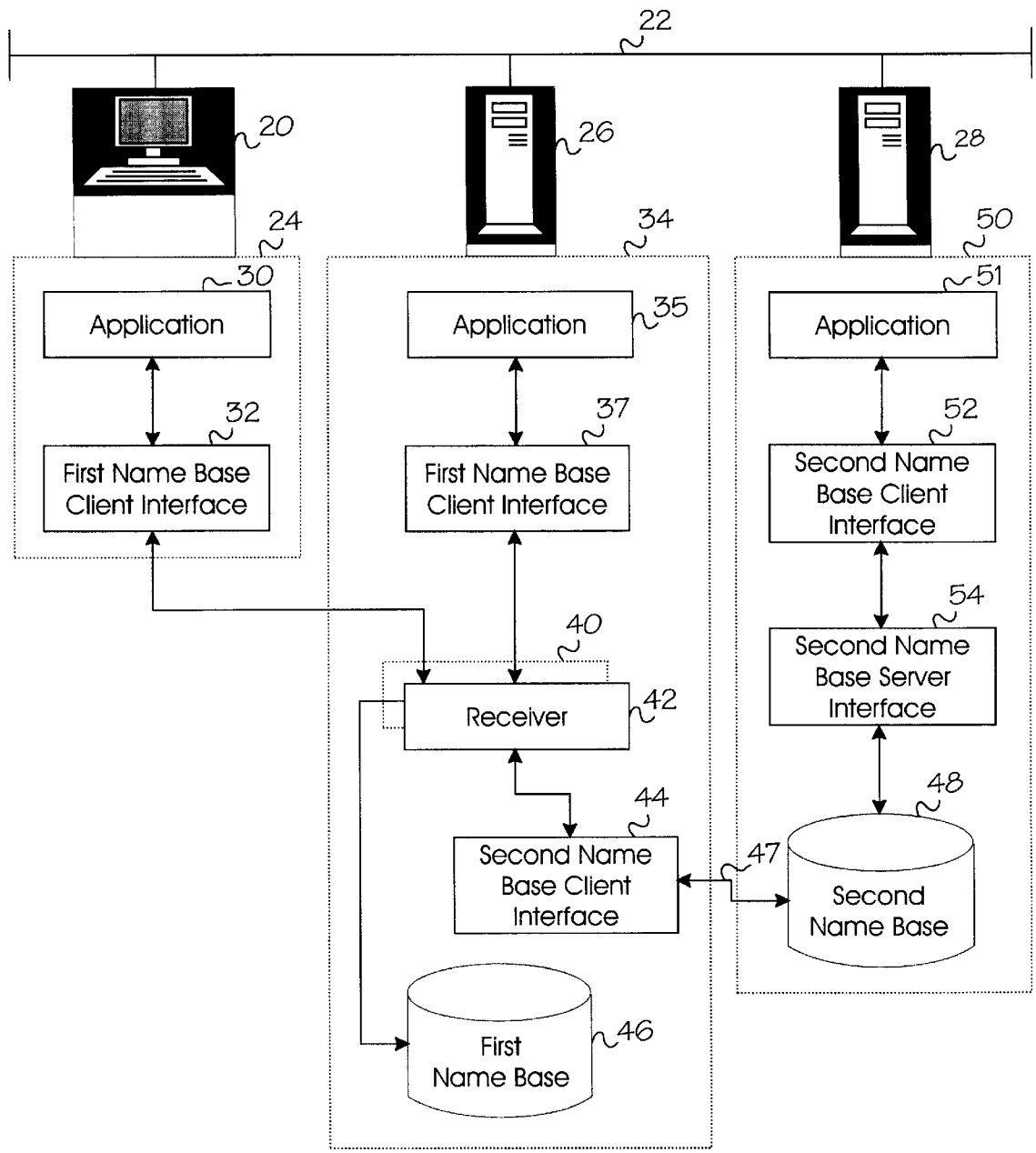
FIG. 1 is a diagrammatic view of a system of the present invention for supplanting a first name base with a second name base, according to one embodiment of this invention.

Referring to FIG. 1, a diagrammatic view of various processes and name bases prior to and after implementation of the present invention are shown. A run-time environment 50 contains some of the processes and/or data associated with a server 28, and includes an application 51 and a second name base 48. The phrase "name base" as used herein refers to a repository of information regarding entities associated with a network, including, for example, names and other attributes associated with network entities. The name base can comprise a file, a collection of files, a database, or data structure. A name base typically has associated with it certain software for accessing and maintaining the name base, such as a second name base client interface 52, and a second name base server interface 54. This software isolates programs which utilize the information stored within the name base from directly interacting with the underlying physical structure of the name base.

Second name base 48 is associated with a particular network operating system (NOS). Network operating systems are increasingly important in today's computing environments as the framework which allows computers to access other computers, printers, facsimile machines, and the like. Network Administration requires highly-compensated personnel, and failure to properly administer a network can result in expensive business interruptions. At least one network operating system, NOVELL NETWARE, has become an industry leader in providing intuitive, flexible and robust administration of a company's network. However, most companies choose to implement multiple network operating systems from different NOS vendors on their network, to leverage the benefits that each NOS has to offer. Unfortunately, this requires administration of multiple network operating systems.

Each NOS typically maintains one or more name bases. The method and system according to the present invention provide a mechanism for transparently supplanting the name base(s) of a first network operating system with the name base of a second NOS. The present invention eliminates duplication of data which would otherwise exist in multiple name bases, and allows administration of all network entities through administration utilities associated with the second name base. Because the first name base is supplanted by the second name base in a transparent fashion, administrative utilities associated with the first name base will continue to function, but all communications will be transparently redirected to the second name base. In this manner, the present invention "virtualizes" the first name base because processes continue to operate as if they are interacting with the first name base, when in fact they are interacting with the second name base.

Initially the method for communicating with a first name base prior to implementation of the present invention will be discussed. A NOS server 26 is coupled to a local area network (LAN) 22. A workstation 20 and NOS server 28 are also coupled to LAN 22, allowing processes on servers 26, 28 and workstation 20 to communicate with each other. A NOS administration application 35 is executing in a run-time environment 34 of server 26. Application 35 is associated with a particular NOS which maintains entity information in a first name base 46. To interact with first name base 46, application 35 invokes a first name base client interface 37 with a request for first name base 46. Server process 37, in turn, invokes a first name base server interface 40, which isolates first name base 46 from direct access from applications, eliminating the need for developers of applications to be concerned with the physical layout of first name base 46. The word "process", as used herein, refers to a functional processing segment as opposed to a specific type of task, such as a thread or dynamic link library. Thus, a process might be implemented in any particular environment as any of a number of different threads, dynamic link libraries or other types of tasks, as suitable for the particular implementation. The present invention can be implemented in any conventional programming language such as C, C++, or JAVA.

The response from first name base server interface 40 is returned to first name base client interface 37, and ultimately to application 35. Accessing first name base 46 from workstation 20 follows a similar process. An application 30, such as an electronic mail application, accesses a first name base client interface 32, which then invokes the first name base server interface 40 with a request for first name base 46. The response is then returned from first name base server interface 40 to first name base client interface 32, and then to application 30. First name base client interface 32 can communicate with first name base server interface 40 over LAN 22 through mechanisms such as remote procedure calls (RPC), object-oriented transport mechanisms such as object request broker (ORB), or proprietary protocols such as NETWARE Core Protocol (NCP).

While only a single server and first name base 46 are illustrated in FIG. 1, certain network operating systems require a separate name base for each server that acts as a security authority, resulting in a plurality of servers and name bases that must be administered.

The method and system according to one embodiment of this invention allows a name base associated with one NOS to supplant, or "virtualize", the name bases of other network operation systems. One mechanism for supplanting first name base 46 with second name base 48, according to the present invention, is by developing a redirection module which receives requests directed to first name base 46, translates these requests into a format suitable for second name base 48, and communicates the requests to second name base 48. The redirection module then receives the response returned from second name base 48, reformats or translates the response into a first name base format, and then returns the response to the calling process. Such a redirection module, according to one embodiment of this invention, comprises a receiver process 42 and a communicator process such as second name base client interface 44. Although the receiving, translation and communication functions of the redirection module are broken into two separate processes in the embodiment illustrated in FIG. 1, it is apparent to those skilled in this art that such functions can be provided in a single process, or, as shown, separated into multiple processes, as may be suitable for the particular design of the system.

Receiver process 42 is installed on server 26 and receives method or function invocations of first name base client interface 37. Several mechanisms known to those skilled in the art can be used to redirect calls made to one process to another process. One such mechanism is known as "hooking" another process's functions. "Hooking" involves determining the memory address of the functions associated with first name base server interface 40, and installing at those memory locations pointers to the functions associated with receiver process 42. Another mechanism is to replace first name base server interface 40 with receiver process 42, by giving receiver process 42 the same name as first name base server interface 40, and copying receiver process 42 over first name base server interface 40. First name base server interface 40 is shown in FIG. 1 in dashed lines to reflect that it will no longer be active after receiver process 42 has been installed on server 26.

Receiver process 42 offers the same entry points, or external interface, as first name base server interface 40.

Thus, to an invoking process, such as first name base client interface 37, it is transparent that it is invoking receiver process 42 rather than first name base server interface 40. Upon invocation by first name base client interface 37, receiver process 42 examines the request which was directed to first name base 46 and, based on the type of request, translates the request into an analogous request for second name base 48. The translated request is then communicated from receiver process 42 to second name base client interface 44, which sends the translated request over network 22 to second name base 48. Although arrow 47 indicates direct communication between communicator process 44 and second name base 48, typically there is a layer of software executing in run-time environment 50 that manipulates and maintains the data within second name base 48. Second name base 48 receives the translated request, generates a response, and sends the response over network 22 to second name base client interface 44. Second name base client interface 44 returns the response to receiver process 42, which examines the response, and translates the response into one or more responses in the first name base format. The translated response is then returned to either first name base client interface 37, if the request initiated from server 26, or to first name base client interface 32, if the request initiated from workstation 20. In either event, the appropriate application receives a response to its request to first name base 46 in the first name base format, and is thus unaware that the request was satisfied through interaction with second name base 48 rather than first name base 46.

The method and system according to this invention transparently redirect communications directed to first name base 46 to second name base 48. Applications, such as application 30 and application 35, can continue to execute, without modification, as if communicating with first name base 46, and the redirection of communications to second name base 48 is transparent to such applications. Thus, no disruption to existing applications occurs, and individuals that are familiar with interacting with applications 30 and 35 can continue to use them. Several advantages accrue through the supplanting of first name base 46 with second name base 48. Duplication of entity information is eliminated, and backup of the name base information is simplified. Administration of all entities can now be carried out by interacting with a single name base. Moreover, if second name base 48 has more robust administration features than first name base 46, such as an advanced directory services or security features, these features can now be used in administration of entities previously associated with first name base 46. Synchronization of multiple name bases is no longer necessary, increasing available network band width.

The method and system according to this invention include a migration process for migrating, or moving, entities and attributes which exist in first name base 46 to second name base 48 prior to the initial installation of receiver process 42 and first name base client interface 44 on server 26. The migration process reads first name base 46, and for each entity stored in first name base 46, creates a corresponding entity in second name base 48. The attribute information associated with each entity is copied from first name base 46 to second name base 48. Name base entities associated with a particular NOS typically have a number of default attributes, but entities associated with one NOS may have different default attributes than a corresponding entity associated with another NOS. Most NOS vendors provide some mechanism for extending or modifying its name base entities to include additional attributes. Some name bases, such as the name base associated with NOVELL NET-WARE network operating system, maintain entities as objects, the classes of which can be programmatically modified to include additional attributes. Thus, if entities in first name base 46 have attributes that do not exist in second name base 48, the classes associated with the objects in second name base 48 can be extended to include attributes for maintaining this information. A primary consideration is to ensure that second name base 48 is operative to retain any information that can be maintained in first name base 46. The migration process need only execute once, preferably immediately prior to installation of receiver process 42 and communicator process 44. After receiver process 42 and communicator process 44 have been installed, subsequent updates directed to first name base 46 will be redirected to second name base 48, as described above.

Vendors of network operating systems typically publish an application programming interface (API) that programs can access to retrieve or update the objects in the name base associated with the NOS. The migration process according to this invention preferably uses such APIs to implement the copying described herein.

Variations on the system shown in FIG. 1 are possible. For example, second name base 48 and any associated processes can execute on server 26, eliminating the need for communications over LAN 22, as well as a separate server 28. According to another embodiment of the present invention, receiver process 42 and second name base client interface 44 are installed directly on workstation 20 rather than server 26. These modules can replace an existing process on workstation 20 such as first name base client interface 32. If installed directly on workstation 20, communications bypass server 26 entirely and go directly from workstation 20 to server 28 over LAN 22, eliminating the need for server 26. While this approach requires modifying many individual workstations 20, instead of a single server 26, administration utilities now exist which simplify installation of software on client computers from a centralized server 28. One advantage of installing software directly on workstation 20 is the reduction of utilization and traffic over LAN 22.

Figure 2:
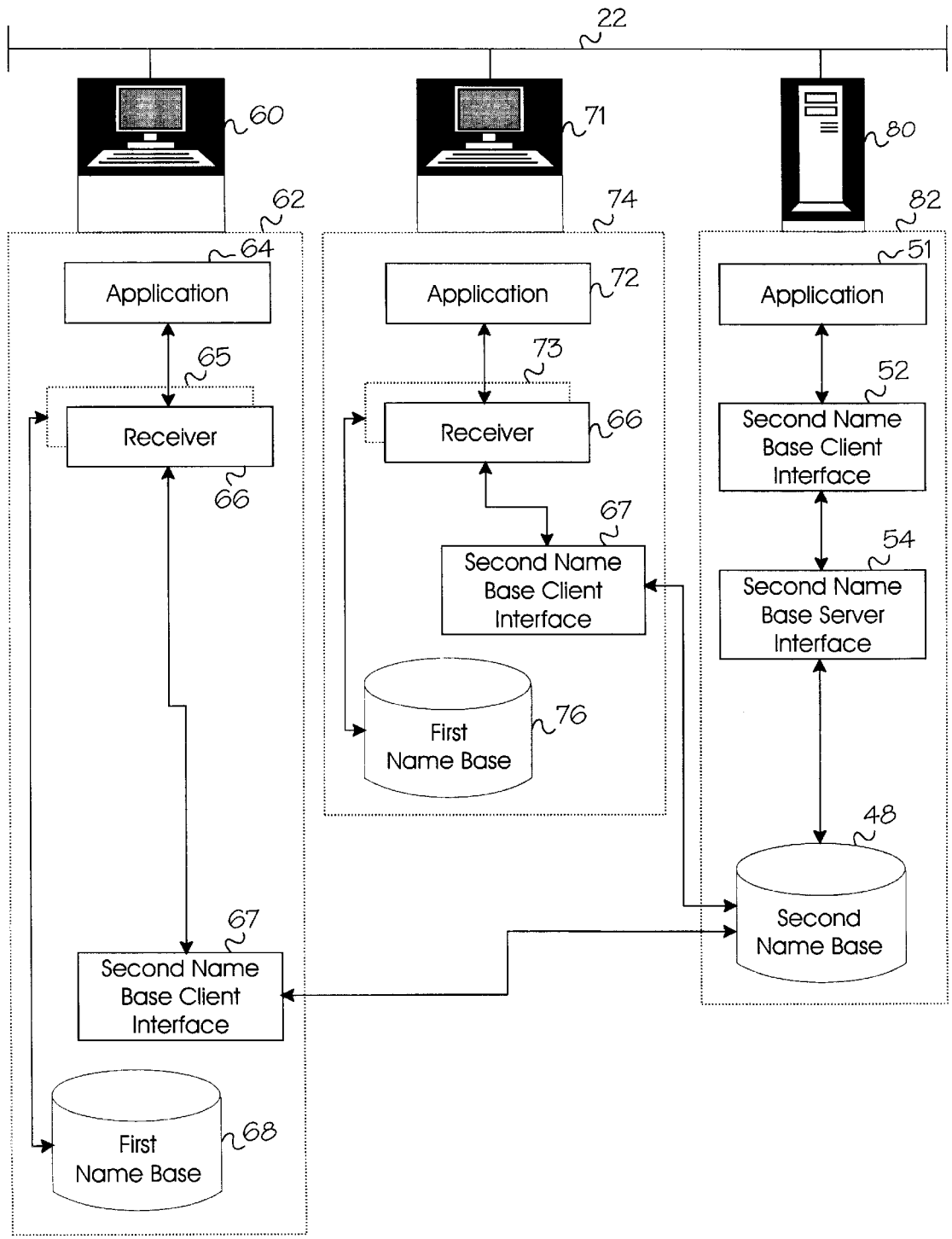
FIG. 2 is a diagrammatic view of a system of the present invention for consolidating a plurality of first name bases into a consolidated second name base, according to another embodiment of this invention.

FIG. 2 is a diagrammatic view of a plurality of workgroup workstations both prior to and after installation of the method and system of the present invention. Workstations 60 and 71 are two of a plurality of workstations which compose a workgroup. A workgroup network operating system is a peer-to-peer NOS, allowing each workstation to be both a client and a server to other workstations. This differs from the client-server NOS illustrated in FIG. 1. In a workgroup NOS, each workstation contains its own name base. For example, workstation 60 maintains its own first name base 68 in run-time environment 62, and workstation 71 maintains its own first name base 76 in run-time environment 74. Before implementation of the present invention, an application 64 accesses first name base 68 via a first name base interface 65. In a similar fashion, application 72 interacts with first name base 76 via first name base interface 73. One such access by application 64 might be to authenticate a user to workstation 60. User credentials, such as a user identifier and password, would be stored in first name base 68. However, unlike the server-based first name base 46 shown in FIG. 1, where a single name base acts a central authority to a plurality of workstations, each workstation in a workgroup acts as its own individual authority for the computer resources it controls. Thus, before application 64 can access a computer resource controlled by workstation 72, name base 76 must be modified to allow application 64 to have access to the resource. This necessitates maintaining and administering as many name bases as there are workstations. Moreover, because first name base 76 in run-time environment 74 will contain network entities that are different from those maintained in first name base 68, each separate name base must be periodically backed-up.

The system of the present invention can consolidate workgroup name bases into a consolidated second name base 48, establishing a central authority for maintaining access to any computer resources associated with workstations. Similar to the embodiment discussed with regard to FIG. 1, a redirection module is developed and installed which receives the calls from workstation applications, such as application 64 and application 72, and redirects the communications to second name base 48. Receiver 66 and second name base client interface 67 contain the receiving, translation and communication functions for receiving the request from application 64, translating it into a second name base format, and communicating it over LAN 22 to second name base 48. Receiver 66 can either hook the functions of first name base interface 65, or can be installed over first name base interface 65. Responses returned from second name base 48 are received by second name base client interface 67, translated by receiver 66 into the first name base format and returned to application 64. Thus, application 64 is unaware that it is interacting with receiver process 66, rather than first name base interface 65. An identical or similar receiver process 66 and second name base client interface 67 are installed in run-time environment 74, and in each run-time environment associated with each workstation which composes the workgroup. Consolidated second name base 48 acts as a central authority that allows administration of each workstation's resources through a single administration point, such as application 51. Prior to implementation of the present invention, backup of name base information required backing up each individual name base from the respective workstation. With the present invention, backup of name base information is greatly simplified since all name base information can be backed up from a single consolidated name base 48.

Figure 3:
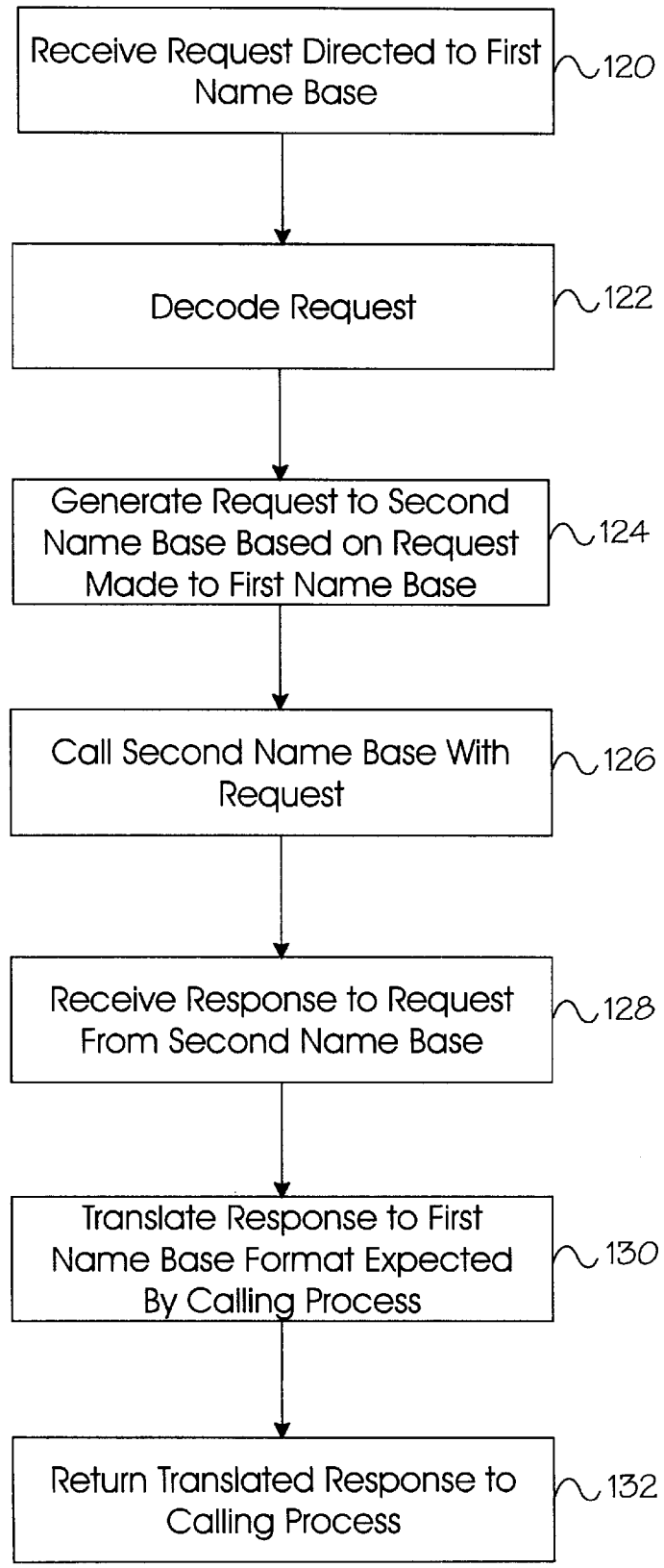
FIG. 3 is a flow diagram illustrating a method for supplanting a first name base with a second name base.

FIG. 3 is a flow diagram showing processing performed by receiver process 42 and second name base client interface 44, according to one embodiment of this invention. At block 120, the redirection module receives a request directed to a first name base. As discussed previously, the redirection module can receive the request by "hooking" another process' functions, or by offering identical entry points as an existing processes, and installing the redirection module over the existing process. Upon reception of the request, at block 122, the request is decoded, and the type of request being made is determined. At block 124, a translated request is generated by the redirection module in a second name base format. If the original request was a modification request, data is extracted from the received request packet and used in the translated request. Such data would typically accompany the original request in the form of one or more parameters. At block 126, the second name base is called with the translated request. If the second name base exists on the same server as the redirection process, this communication can comprise a simple function call. If the second name base exists on a separate server, the communication can take place over the network, through common network interprocess communication. At block 128, the redirection module receives the response to the request from the second name base. At block 130, this response is translated into a response in the first name base format which will be expected by the calling process. At block 132, the translated response is returned to the calling process. The calling process then processes the translated response, unaware that communications occurred with the name base associated with a different network operating system.

The foregoing description of preferred embodiments of the invention have been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for redirecting a request directed to a first name base to a second name base, comprising:

receiving a request initiated by a process that is directed to a first name base;

translating the request from a first name base format to a second name base format suitable for communications with a second name base, wherein the name bases include information regarding one or more network entities;

generating a translated request;

calling the second name base with the translated request;

receiving a response to the translated request from the second name base;

translating the response from the second name base format to the first name base format suitable for communications with the first name base, generating a translated response; and returning the translated response to the requesting process.

2. A method according to claim 1, further comprising moving a plurality of objects from the first name base to the second name base before the receiving a request step.

3. A method according to claim 2, wherein the moving step further comprises extending classes associated with the second name base for containing representations of data from the first name base.

4. A method according to claim 1, wherein the translating the request step comprises moving portions of data from a parameter list in the request in the first name base format to a parameter list in the translated request in the second name base format.

5. A method according to claim 1, wherein the redirection of a request directed to the first name base to the second name base is transparent to the process.

6. A method according to claim 1, wherein the second name base is associated with a computer network server which is different from a computer network server with which the first name base is associated.

7. A method for replacing a first name base with a second name base, comprising:

moving and storing existing representations stored in a first name base to a second name base, wherein the name bases include information regarding one or more network entities;

receiving a request directed by a requestor to the first name base;

forwarding the request to the second name base; and returning a response from the second name base to the requester in a first name base format.

8. A method according to claim 7, wherein the moving step comprises reading attributes of objects from the first name base, creating corresponding objects in the second name base, and storing the attribute data read from the first name base into attributes associated with the corresponding objects in the second name base.

9. A method according to claim 7, further comprising translating the request from a first format suitable for communications with the first name base to a second format suitable for communications with the second name base before the request is forwarded to the second name base.

10. A method according to claim 9, wherein the returning step further comprises translating data associated with the response from the second format suitable for communications with the second name base to the first format suitable for communications with the first name base.

11. A method according to claim 7, wherein the replacement of the first name base with the second name base is transparent to at least some processes attempting to communicate with the first name base.

12. A method according to claim 7, wherein the first name base and the second name base are located on different computer servers.

13. A method according to claim 7, wherein the receiving step further comprises replacing a first process associated with the first name base with a second process operative to provide the same external interface that is associated with the first process.

14. A system for replacing a first name base with a second name base, comprising:
  a migration and storing process operative to migrate and store data from a first name base to a second name base, wherein the name bases include information regarding one or more network entities;
  a receiving process operative to receive a request from a first process to the first name base;
  a first translation mechanism coupled to the receiving process operative to translate the request from a first name base format to a second name base format;
  a second name base;
  a redirection mechanism coupled to the first translation mechanism operative to communicate the request in the second name base format to the second name base; and
  the second name base being operative to receive the request from the redirection mechanism.

15. A system according to claim 14, wherein the migration process extends a class associated with the second name base, the extended class being operative to store data associated with objects from the first name base.

16. A system according to claim 14, wherein the first process is located on a computer coupled to a network, the first name base is associated with a first computer server coupled to the network, and the second name base is associated with a second computer server coupled to the network.

17. A system according to claim 14, wherein the receiving process comprises a second function process associated with the second name base that replaces a first function process associated with the first name base, the second function process having an interface which is operative to communicate with the same processes with which the first function process is able to communicate.

18. A system according to claim 14, wherein the redirection mechanism is further operative to receive a response generated by the second name base in response to the request from the redirection mechanism, and is operative to direct the response to the first process.

19. A system according to claim 18, further comprising a second translation mechanism coupled to the redirection mechanism, the second translation mechanism operative to translate the response from the second name base format to the first name base format.

20. A method for consolidating a plurality of first name bases into a consolidated second name base, comprising:
  receiving a request directed by a requesting process to one of a plurality of first name bases;
  translating the request from a first name base format to a consolidated second name base format suitable for communications with a second name base, wherein the name bases include information regarding one or more network entities generating a translated request;
  calling the consolidated second name base with the translated request;
  receiving a response to the translated request from the second consolidated name base;
  translating the response from the consolidated second name base format to the first name base format suitable for communications with the first name base, generating a translated response; and
  returning the translated response to the requesting process.

21. A method for redirecting a request directed to a first name base to a second name base, comprising:
  receiving a request initiated by a process that is directed to a first name base, developing a replacement library having entry points suitable for communication with the process, and replacing an existing library associated with the first name base with the replacement library;
  translating the request from a first name base format to a second name base format suitable for communications with a second name base, generating a translated request;
  calling the second name base with the translated request;
  receiving a response to the translated request from the second name base;
  translating the response from the second name base format to the first name base format suitable for communications with the first name base, generating a translated response; and
  returning the translated response to the requesting process.

22. A method according to claim 21, further comprising moving a plurality of objects from the first name base to the second name base before the receiving a request step.

23. A method according to claim 22, wherein the moving step further comprises extending classes associated with the second name base for containing representations of data from the first name base.

24. A method according to claim 21, wherein the translating the request step comprises moving portions of data from a parameter list in the request in the first name base format to a parameter list in the translated request in the second name base format.

25. A method according to claim 21, wherein the redirection of a request directed to the first name base to the second name base is transparent to the process.

26. A method according to claim 21, wherein the second name base is associated with a computer network server which is different from a computer network server with which the first name base is associated.

* * * * *